United States Patent Office 3,317,483
Patented May 2, 1967

3,317,483
HYDROXYALKYL CONTAINING ADDITION POLYMERS OF TERTIARYALKOXYALKYL ESTERS
Joseph A. Verdol, Dolton, Ill., assignor to Sinclair Research, Inc., Wilmington, Del., a corporation of Delaware
No Drawing. Filed June 18, 1962, Ser. No. 202,963
14 Claims. (Cl. 260—78.4)

This invention is a novel composition of matter; namely, vinylene-type copolymers and homopolymers of tertiaryalkoxyalkyl esters of unsaturated carboxylic acids, and a novel method for their preparation. By "vinyl" or "vinylene-type" polymers is meant polymers formed by additional polymerization at the double bond of the monomer. The polymers of this invention may be readily converted into polymers having hydroxyalkyl side chains. The polymers are useful in coating compositions, adhesive and laminating compositions, synthetic rubbers, films, fibers and in other related applications.

The use of this invention to prepare polymers having hydroxyalkyl side chains has many advantages over the introduction of hydroxyalkyl groups into polymer systems by polymerization or copolymerization of a monomer containing hydroxyalkyl groupings. For example, it is usually quite difficult and expensive, especially in the case of unsaturated dicarboxylic acids, to prepare hydroxyalkyl esters in pure form, owing to the formation of undesired polymeric products. Even in the case of unsaturated monocarboxylic acids, it is often difficult to prepare pure hydroxyalkyl esters, owing to side reactions which result in diester formation. If pure hydroxyalkyl esters are not employed for polymerization, the resulting polymer will often become cross-linked and insoluble during polymerization and will, therefore, be useless for coatings, laminating resins, etc., where cross-linking is undesired until after the coating or laminating formulation has been applied to the coating or laminating surfaces. Furthermore, the hydroxyalkyl monomer being polymerized can react prior to or during polymerization with the catalyst or with other functional groups of the system, which often results in inhibition of polymerization or in a deleterious change in the properties of the final polymer. On the other hand, if potential hydroxyalkyl groups are introduced into the polymer system by homopolymerizing or copolymerizing a tertiaryalkoxyalkyl ester one does not encounter the difficulties cited above. Since the hydroxyalkyl groups are blocked, that is, exist as tertiaryalkoxyalkyl groups during polymerization, there need be little concern about side reactions with most polymerization catalysts or with other functional groups of the system.

Polymers according to this invention contain the residue of a tertiaryalkoxyalkyl ester of an unsaturated carboxylic acid. The acid group generally is of about 3–40 or 43 carbon atoms. This ester residue usually appears as the repeating group

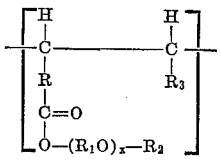

where R is a hydrocarbon radical, preferably unsubstituted. R is of 0–40 or more carbon atoms, preferably 0 to 20 carbon atoms, aromatic, straight, branched or cyclic aliphatic; it may be saturated or unsaturated and may be substituted with other materials or radicals which do not interfere with reactions or the uses of the finished material; it is generally part of the hydrocarbon residue of a carboxylic acid.

$R_1$ is a divalent aliphatic hydrocarbon radical, for example, alkylene, of 2 to 12, preferably 2 to 8 carbon atoms. This radical can be saturated, unsaturated, substituted (even with inorganic materials such as silicon or boron), or unsubstituted, straight, branched or cyclic aliphatic. Ordinarily $R_1$ is the hydrocarbon residue of a glycol and for a simple glycol residue the value of $x$ is 1. Where $x$ is a number greater than 1, the radical —$(R_1O)$— is the residue of a polyglycol or ether glycol such as polyethylene glycol, etc. Preferably $x$ is 1 to 5 although it may be up to about 25 or more. $R_2$ is a monovalent tertiary aliphatic hydrocarbon radical of 4 to 10, preferably 4 to 7, carbon atoms and is usually derived from a tertiary olefin. The tertiary radical has its valence bond to the —$(R_1O)_x$— group at the tertiary carbon of the $R_2$ group. $R_3$ is a hydrogen or monovalent organic radical, generally hydrocarbon or carboxyl. $R_3$ often is lower alkyl, advantageously of 1 to 4 carbon atoms, but it may have up to 40 or more carbon atoms and be aromatic, straight, branched or cyclic aliphatic, saturated or unsaturated, and unsubstituted or substituted with non-deleterious components. $R_3$ also may frequently be another

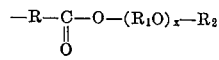

or a closely related group. In addition the H positions of the repeating group may sometimes be occupied by various radicals, especially lower alkyl radicals, say, of 1–4 carbon atoms. As mentioned, polymers embodying this invention may be simple homopolymers having the repeating tertiarylalkoxyalkyl (T) group

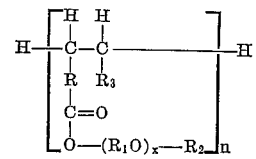

or the polymer may be a copolymer in which the T group is interspersed with other vinyl-type groups, which may sometimes be other tertiaryalkoxyalkyl ($T^1$) groups, or unrelated (U) groups. The copolymer may be of the alternating type, for example —T—U—T—U—, or may be a block copolymer such as

Graft copolymers such as

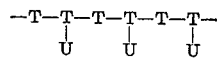

are also included within the scope of this invention. Polymers according to the instant invention are usually solids at ambient temperatures and have average molecular weights of about 500 to several million, say, up to about two million or more. Often the polymer will have an average molecular weight of about 100,000 to 500,000. The T and $T^1$ groups will comprise at least about 1% by weight of the polymer, usually about 5 or 25 to 75% by weight. Unrelated (U) groups may therefore comprise up to about 99% of copolymers, for instance about 25 to 75 or 95%.

Polymers according to this invention are formed by polymerization of the tertiaryalkoxyalkyl ester monomer

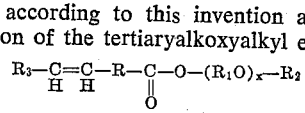

As will appear obvious to those skilled in the art, the polymerization feed may comprise 1–100% of this monomer, the essential balance comprising other vinyl-type compounds, that is, olefinic copolymerizable hydrocarbons, etc., needed to give the desired copolymer.

The monomer, in turn, can be made by esterifying the unsaturated carboxylic acid material

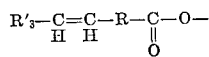

with tertiaryalkoxy-alkanol of the formula $$R_2-(OR_1)_x-OH$$

This acid material may be any suitable material which contains one or more unsaturated carbon bonds and one or more acid functionalities, that is, the "non-oxo carboxylic" (acid, ester, chloride or anhydride) group characterized by the

configuration. Preferably the unsaturation is mono-olefinic. The ester is formed from the acid material and tertiaryalkoxyalkanol by addition and esterification in the case of the anhydride, esterification in the case of the free acid or the chloride, and transesterification in the case of other esters. The tertiary alkoxyalkanol is generally used in the amount sufficient to esterify all the available

groups. Such an amount, in the case of a monocarboxylic acid material is, of course, at least one equimolar amount and in the case of a dicarboxylic acid material, that is, where R′₃ is or contains a carboxy group, is at least twice the molecular amount of acid material, etc.

Direct esterification with the ether alcohol may be catalyzed or non-catalyzed and may be conducted in the absence or presence of an inert solvent such as toluene or xylene, which removes the water formed during the esterification reaction as an azeotrope. Conventional esterification catalysts such as sodium bisulfate, sulfonic acids, sulfuric acid, phosphoric acid, cationic resin catalysts, etc., may be employed but, since these materials have a tendency to decompose some of the tertiaryalkoxyalkanol, non-catalyzed procedures are preferred when direct esterification is to take place. Preferred temperatures for direct esterification are about 100 to 150° C.

Transesterification or ester interchange is employed to convert other esters of the carboxylic acid to the tertiaryalkoxyalkanol esters and in such circumstances the stoichiometric amount of the tertiary alkoxyalkanol needed to esterify every carboxyl group of the acid material is preferably reacted in order to obtain a pure product. The ester interchange reaction may be carried out in the presence of the acid catalysts mentioned above, but preferably the reaction uses a basic or at least less acidic catalyst than employed in direct esterification. Effective catalysts are tetraisopropyl titanate, tin oxalate, dibutyl tin oxide, lead oxide, zinc stearate or manganous acetate. The alkali metals may be used and may be in the form of their alcoholates, prepared separately or in situ by adding small amounts of the alkali metals to the t-alkoxyalkanol. Alkali metal hydrides such as calcium, sodium, magnesium and lithium hydrides are also suitable catalysts. The ester interchange reaction is normally carried out at about the reflux temperature of the reaction mixture at atmospheric pressure, but may be conducted at reduced pressure if desired. Preferred temperatures are in the range of about 100–200° C., alhough the temperature may reach about 275° C. or more.

As mentioned, acid catalysts, especially strong-acid catalysts, are preferably avoided in order to obviate internal reactions of the ether-alcohol. Catalyst concentrations for catalyzing both esterification and ester interchange reactions are usually in the range of about 0.01 to 2%. After the reaction is complete the tertiaryalkoxyalkyl esters may be separated from the reaction mixture using the solvents mentioned above. Other common methods of purification, such as sublimation, crystallization, distillation, extraction, etc., may also be employed if desired.

Typical carboxylic acids which may be used to provide the

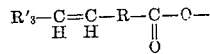

group in accordance with this invention are acrylic and substituted acrylic acids such as crotonic and other butenic acids, maleic acid, itaconic acid, fumaric, citraconic, oleic, ricinoleic, linoleic, linolenic, dimethyl vinyl acetic acids, etc. As mentioned, the inner or outer anhydrides of these acids are usable as well as the acyl chlorides or the mono- or polyesters of these acids. When a fully esterified acid derivative is to be converted to the tertiaryalkoxyalkyl ester by ester interchange, the ester group is preferably lower alkyl, to provide for removal of the alcohol of decomposition by vaporization during the ester interchange.

Mono and dicarboxylic mono-unsaturated acids of 3 to 12 carbon atoms and their diesters with lower alkanols, are the preferred acid starting materials to produce the preferred esters for polymerization. Where the R₃ group is an ester group different from the

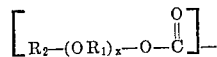

radical, the R₃ substituent can be added to the acid functionality by esterification before the resulting material is esterified with the tertiaryalkoxyalkanol. Even before this "unbalancing" esterification, however, it is advisable first to esterify the acid group which is later to be reacted with the tertiaryalkoxyalkanol with a simple low molecular weight alcohol such as methanol, which later is removed in transesterification.

The tertiaryalkoxyalkanol, $R_2-(OR_1)_x-OH$, is generally prepared by etherification of the glycol $$H(OR_1)_xOH$$

with a tertiary olefin, that is, an olefin having a double bond at its tertiary carbon atom, as described in my copending application Ser. No. 177,747, filed March 6, 1962. This etherification reaction may be conducted using a cationic exchange material in the hydrogen form and in an amount sufficient to catalyze the selective conversion to the tertiary alkyl monoether. Among the ion exchange materials useful for this reaction are relatively high molecular weight water-insoluble resins or carbonaceous materials containing an SO₃H functional group or a plurality of such groups. These catalysts are exemplified by the sulfonated coals (Zeo-Karb H, Nalcite X, and Nalcite AX) produced by the treatment of bituminous coals with sulfuric acid, and commercially marketed as zeolitic water softeners or base exchangers. These materials are usually available in a neutralized form, and in this case must be activated to the hydrogen form by treatment with a mineral acid, such as hydrochloric acid, and water washed to remove sodium and chloride ions prior to use. Sulfonated resin type catalysts include the reaction products of phenol-formaldehyde resins with sulfuric acid (Amberlite IR–1, Amberlite IR–100, and Nalcite MX). Also useful are the sulfonated resinous polymers of coumarone-indene with cyclopentadiene, sulfonated polymers of coumarone-indene with furfural, sulfonated polymers of coumarone-indene with cyclopentadiene and furfural and sulfonated polymers of cyclopentadiene with furfural. The preferred cationic exchange resin is a strongly acidic exchange resin consisting essentially of a sulfonated polystyrene resin, for instance a divinylbenzene cross-linked polystyrene matrix having about 0.5 to 20 percent, preferably about 4 to 16%, divinylbenzene therein to which are attached ionizeable or functional nuclear sulfonic acid groups. This resin is manufactured and sold commercially under various tradenames, e.g. Dowex 50, Nalcite HCR, Permutit Q. This resin, as commercially obtained, has a moisture content of about 50% and it can be used in the etherification process in this form or it can be dried and then used with little or no differences in results ascertainable. The resin can be dried as by heating at a temperature of about 212° F. for 12 to 24 hours or the free water can be removed as by refluxing with benzene or similar solvents and then filtering. The catalyst concentration range should be sufficient to provide the desired catalytic effect, e.g. between about 0.5 and 50 percent (dry basis) by weight of the reactants, with the preferred range being between about 5 to 25 percent (dry basis), for example, 10 percent. A weight hourly space velocity of about 1 to 8 (based on hydrocarbon feed) and up to about 17 based on total hydrocarbon and glycol may be used with advantage. The WHSV can be about 0.1 to 100 based on hydrocarbon feed only, with the preferred WHSV being about 2 to 20.

The ether-alcohol can be formed by reacting the tertiary olefin with about 0.1 to 100 moles of the glycol per mole of tertiary olefin, the usual amount being between about 0.5 to 5 moles of glycol per mole of tertiary olefin. The reaction, for example in the case of isobutylene and ethylene glycol, can proceed as follows:

$$CH_2=\underset{CH_3}{\overset{CH_3}{C}} + HO-CH_2CH_2OH \longrightarrow$$

$$CH_3-\underset{CH_3}{\overset{CH_3}{C}}-OCH_2CH_2OH + CH_3-\underset{CH_3}{\overset{CH_3}{C}}-OCH_2CH_2O\underset{CH_3}{\overset{CH_3}{C}}-CH_3$$

2-Tertiarybutoxy ethanol (TBE)     1,2-ditertiarybutoxy ethane (DTBE)

The tertiary alkanol ethers of the following glycols and polyols may be used, for example: ethylene glycol, diethylene glycol, polyethylene glycols, propylene glycol, polypropylene glycol, mixed ethers of ethylene and propylene glycols, butylene glycols, 1,5-pentanediol, 2-ethylhexane-1-3-diol, 1,10-decane diol, trimethylol propane, glycerine neopentyl glycol, and pentaerythritol. In the case of diols, the monoteritaryalkyl ether is employed for esterification. However, in the case of triols, tetraols and higher polyols, it is possible to use mono-, di-, or tritertiaryalkyl ethers, so long as at least one free OH group is available for esterification. It is also possible to use tertiaryalkyl ether derivatives of polyols which contain inorganic atoms, such as boron, silicon, aluminum, tin, lead, etc. Ethers representative of those which may be employed to form the esters of this invention are:

$$\underset{(I)}{\overset{CH_2Ot\text{-}Butyl}{\underset{CH_2Ot\text{-}Butyl}{H-C-OH}}} \quad \underset{(II)}{\overset{CH_2Ot\text{-}Butyl}{\underset{CH_2OH}{H-C-CH_2Ot\text{-}Butyl}}} \quad \underset{(III)}{\overset{CH_2Ot\text{-}Butyl}{\underset{CH_2Ot\text{-}Butyl}{HOCH_2-C-CH_2Ot\text{-}Butyl}}}$$

$$\underset{(IV)}{\overset{CH_2Ot\text{-}Butyl}{\underset{CH_2Ot\text{-}Butyl}{HOCH_2C-CH_2OH}}} \quad \underset{(V)}{\overset{CH_3\ CH_2Ot\text{-}Butyl}{\underset{CH_3\ CH_2OH}{>C<}}} \quad \underset{(VI)}{\left(\overset{CH_2CH_2Ot\text{-}Butyl}{\underset{Si-CH_2-CH_2OH}{|}}\right)_3}$$

$$\underset{(VII)}{\overset{CH_2OH}{B(CH_2CH_2Ot\text{-}Butyl)_2}}$$

$$\underset{(VIII)}{\overset{H-C-CH_2Ot\text{-}Butyl}{\underset{H-C-CH_2OH}{||}}} \quad \underset{(IX)}{\overset{C-CH_2Ot\text{-}Butyl}{\underset{C-CH_2OH}{|||}}} \quad \underset{(X)}{\overset{CH_2-CH_2-Ot\text{-}Butyl}{\underset{CH_2CH_2OH}{\underset{|}{S}}}}$$

The esters of this invention may also sometimes be prepared by esterifying one hydroxyl of the glycol with the acid before etherification of the other hydroxyl with tertiary olefin, but this procedure applied to polycarboxylic acid may lead to reaction products containing mixed shortchain polyesters which are desirably avoided.

Polymerization of unsaturated esters of tertiaryalkoxyalkyl esters of carboxylic acids has been carried out employing a variety of polymerization techniques. In many cases these monomers were homopolymerized, and in other cases copolymers were prepared. Typical examples of tertiaryalkoxyalkyl esters which have been employed in accordance with the present invention are as follows:

$$\overset{CH-CO_2CH_3}{\underset{CH-CO_2CH_2CH_2Ot\text{-}Butyl}{||}}$$

Methyl 2-tertiarybutoxyethyl maleate $$CH_3-CH=CH-\overset{O}{\underset{||}{C}}-OCH_2CH_2O\text{-}t\text{-}Butyl$$

Tertiarybutoxyethyl crotonate $$CH_2=\underset{}{\overset{CH_3}{C}}-\overset{O}{\underset{||}{C}}-OCH_2CH_2O\text{-}t\text{-}Butyl$$

Tertiarybutoxyethyl methacrylate $$\overset{CH_2=C-CO_2CH_2CH_2O\text{-}t\text{-}Butyl}{\underset{CO_2CH_2CH_2O\text{-}t\text{-}Butyl}{\underset{CH_2}{|}}}$$

Bis(2-tertiarybutoxyethyl)itaconate $$\overset{CH_2=C-CO_2CH_2CH_2O-t\text{-}Butyl}{\underset{CO_2CH_3}{\underset{CH_2}{|}}} \quad or \quad \overset{CH_2=C-CO_2CH_3}{\underset{CO_2CH_2CH_2Ot\text{-}Butal}{\underset{CH_2}{|}}}$$

Methyl 2-tertiarybutoxyethyl itaconate $$CH_2=CH-\overset{O}{\underset{||}{C}}-OCH_2CH_2O-t\text{-}Butyl$$

Tertiarybutoxyethyl acrylate $$\overset{CH-CO_2CH_2CH_2O\ t\text{-}Butyl}{\underset{tBuOCH_2CH_2O_2C-CH}{||}}$$

Bis(2-tertiarybutoxyethyl) fumarate $$CH_3-CH=CH-CO_2\overset{CH_3}{\underset{|}{CH}}-CH_2-O-t\text{-}Butyl$$

Tertiarybutoxypropyl crotonate $$\overset{CH-CO_2CH_2CH_2-t\text{-}Butyl}{\underset{CH_2CO_2-CH}{||}}$$

Methyl 2-tertiarybutoxyethyl fumarate $$CH_2=\overset{CH_3}{\underset{|}{CH}}-CO_2\overset{CH_3}{\underset{|}{CH}}-CH_2-O-t\text{-}Butyl$$

Tertiarybutoxypropyl methacrylate $$\overset{CH-CO_2CH_2CH_2O-t\text{-}Butyl}{\underset{CH-CO_2CH_2CH_2O-t\text{-}Butyl}{||}}$$

Bis(2-tertiarybutoxyethyl) maleate $$CH_2=CH-CO_2CH_2-\overset{CH_3}{\underset{|}{CH}}-O-t\text{-}Butyl$$

Tertiarybutoxypropyl acrylate

These monomers may be homopolymerized in solution, in emulsion or in bulk, by using a catalyst or other source of free radical polymerization initiator, for example, gamma rays from cobalt 60. Among the catalysts which may be employed are benzoyl peroxide, ammonium potassium persulfate, tertiarybutyl perbenzoate, tertiarybutyl hydroperoxide, methyl ethyl ketone peroxide, azobisisobutyronitrile, etc. These catalysts are generally used in an amount of about .005 to 1% by weight of the monomer.

In solution polymerization, generally a 5 to 75% solution of the monomer is employed. Preferably the solvent is one with a low chain transfer constant, such as benzene, alkylbenzenes and cyclohexane. Emulsion polymerization satisfactory employs water and a surface active or emulsifying agent such as sodium lauryl sulfate, sodium stearate, polyalkalene oxides, quaternary ammonium salts, etc. The emulsifying agent can be employed in the amount of about 0.5 to 5% by weight of the monomer, which itself comprises about 10 to 50% by weight of the emulsion.

Polymerization of the teritary alkoxyalkyl ester monomer generally takes place at a temperature of about 5° to 150° C., preferably 20° C. to 100° C. at a pressure from atmospheric to about 100 atmospheres or more, although when some materials, such as ethylene, are used for copolymerization, the pressure may vary from about 1000 to 10,000 p.s.i. and the temperature may be about 250 to 300° C. Generally this reaction will require maintaining these conditions for about 1 to 24 hours, or even longer when polymerization is catalyzed by gamma rays. Such conditions are used whether a teritary alkoxyalkyl ester homopolymer or copolymer is formed. When a random or alternating copolymer is to be formed the monomers are mixed before or during polymerization; to form block copolymers, a prepolymer with reactive ends is formed from one of the monomers and then the other monomer is added Also, some monomeric materials "automatically" produce block copolymers from a mere mixture of monomers. When a graft copolymer is to be formed, a prepolymer is made having reactive sites along its length and then the other monomer is added.

The monomers which can be employed to form with tertiary alkoxyalkyl ester monomer the polymers of this invention are materials containing the olefinic

group, and having sufficient reactivity with the T monomer to form addition polymers, that is, polymers formed by addition of monomers to each other at the site of the double bond. This reactivity may be expressed by the reactivity ratio product $r_1 r_2$ and in order for copolymers to form, the reactivity ratio product should preferably be equal to or less than unity, that is, the reciprocal of $r_1$ would be equal to or less than $r_2$. Reactivity ratios are determined on an empirical basis for each copolymer system, as follows:

$$r_1 = \frac{k_{11}}{k_{12}} r_2 = \frac{k_{22}}{k_{21}}$$

where $k_{11}$ is the rate constant for an $m_1$ radical to react with or add to an $m_1$ monomer; $k_{12}$ is the rate constant for an $m_1$ radical to add to or react with monomer $m_2$. Likewise, $k_{22}$ expresses the rate of reaction between radical $m_2$ and monomer $m_2$ while $k_{21}$ is the rate constant for addition of an $m_2$ radical with an $m_1$ monomer. The suitable olefinic U groups are organic materials of two or more carbon atoms having the characteristic olefinic structure

more usually the vinylene

or vinylidene structure

Thus the U monomer may be vinylidene chloride, chloroprene, methyl methacrylate, lauryl methacrylate, methacrylonitrile, etc., although generally the U monomer will be of the vinyl type, having characteristic vinyl $H_2C=CH-$ radical as appears, for example, in the hydrocarbons isobutylene and butadiene, and in the acrylic acid and vinyl alcohol and their derivatives. Usable acrylic acid derivatives include acrylonitrile, octyl acrylate, methyl acrylate, $\alpha$-chloroacrylonitrile, dimethyl acrylamide, etc. Other vinyl monomer derivatives usable in this invention include vinyl chloride, styrene, vinyl acetate, vinyl benzoate, p-chlorostyrene, 3,5-dichlorostyrene, p-methoxystyrene, vinyl pyridine, vinyl carbazole, etc. Partial homopolymers and copolymers of these olefinic compounds may also be used as the U component. As can be readily understood, the number of possible copolymer systems incorporating T and U groups is almost infinite, and is limited merely to the selection of appropriate monomer systems showing favorable reactivity ratios for copolymerization. Frequently the U groups contain about 2 or 3 to 20 or more carbon atoms, preferably up to about 12 carbon atoms.

Conversion of the tertiaryalkoxyalkyl polymer to the hydroxyalkyl polymer can be performed by heating the tertiaryalkoxyalkyl ester polymer under mild conditions while avoiding side reaction and releasing tertiary olefin. Preferably the temperature is about 70–150° C. and atmospheric or near atmospheric pressure is used. The polymer product desired, however, may require temperatures as low as about 50° C. to be used and these lower temperatures may require pressure reduction in order to get complete vaporization of the teriary olefin by-product. Likewise, temperatures as high as about 200° C. or more may be employed where the starting and product polymer are not unduly deleteriously harmed by such conditions.

Strong acid catalysts such as sodium bisulfate, sulfonic acids or phosphotungstic acid, as well as phosphoric or sulfuric acids may be used, as may the hydrogen form of most cationic exchange resins. Generally the polymer is dissolved in a suitable solvent such as methyl ethyl ketone before heating and the progress of the reaction may be followed by collecting the issolefin liberated by cleavage of the tertiaryalkoxyalkyl grouping of the polymer system, or by analyzing the polymer for hydroxyl groups using infrared or other known analytical techniques. Nitrogen or other purging gas may be employed or the reaction may be conducted under reduced pressure.

The formation of a novel copolymer containing tertiaryalkoxyalkyl groups can be illustrated by the polymerization of styrene and bis(2-tertiarybutoxyethyl) fumarate to form a copolymer, say $x$ moles of styrene and $y$ moles of the fumarate ester. The copolymer formed may then be heated in an acidic solution to liberate isobutylene, which introduces hydroxyethyl groups into the polymer according to the following illustration:

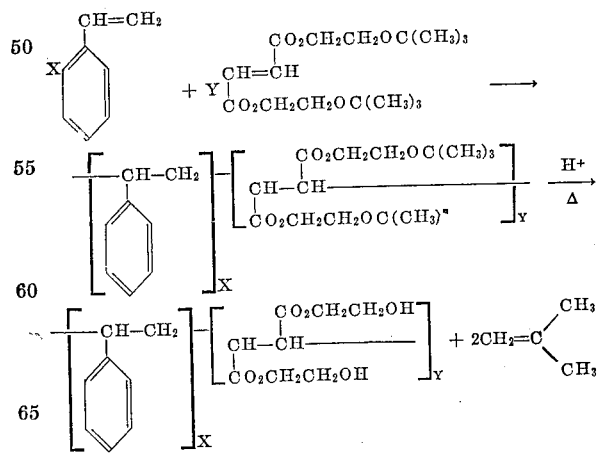

Many polymers and copolymers containing tertiary-alkoxyalkyl groupings or hydroxyalkyl groups are capable of undergoing cross-linking merely by heating the polymers per se at elevated temperatures in the presence of an acidic catalyst. Presumably this cross-linking reaction ensues by transesterification, after liberation of the isoolefin, and involves the splitting out of $HO-(R_1O)-H$, for example, ethylene glycol, between polymer chains, as illustrated below:

*Cross-linking by transesterification*

*Polymer backbone*

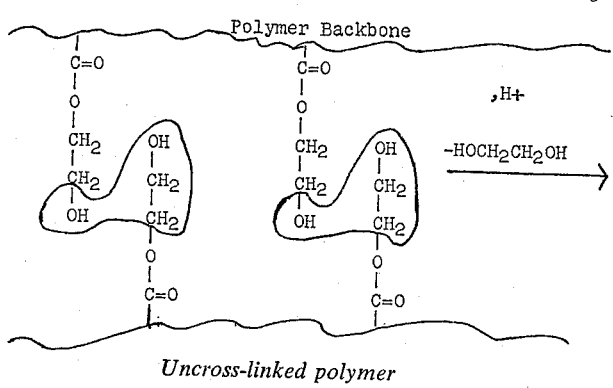

*Uncross-linked polymer*

*Cross-linked polymer*

Some cross-linking of these systems may also occur by splitting out of water between two hydroxyalkyl side chains as shown below. This method of cross-linking, however, occurs to a much smaller degree than cross-linking by transesterification:

*Cross-linking by ether formation*

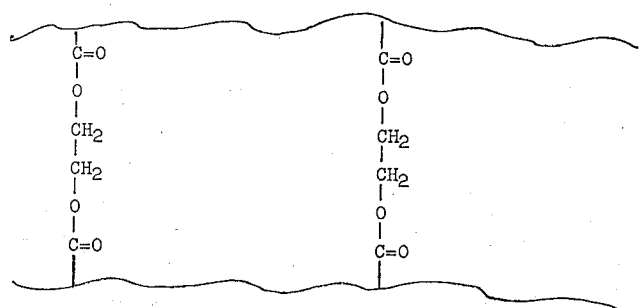

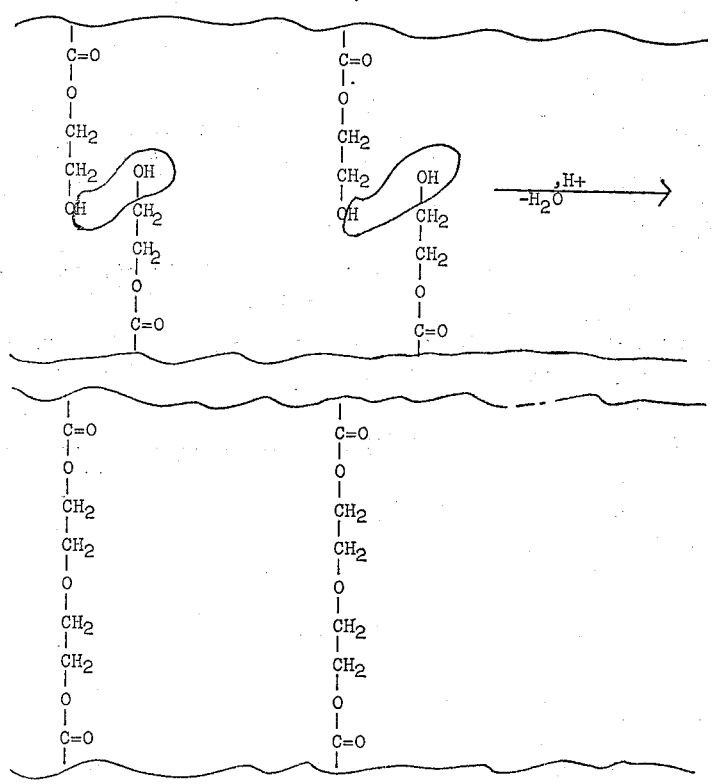

The following examples of this invention are to be considered illustrative only and not limiting:

2-tertiarybutoxyethanol is prepared as follows. Into a 1-liter autoclave are charged 134 g. of isobutylene and 400 grams of commercial grade ethylene glycol. Fifty grams of Dowex 50X–12 sulfonated polystyrene-divinylbenzene type solid resin catalyst containing 12% divinylbenzene is added to the autoclave. The catalyst has a mesh size of about 50–100 and contains from about 42–48 percent moisture. The autoclave is sealed and the reaction mixture heated at 200° F., under autogenous pressure, for a period of about seven hours. The product is removed after cooling and depressurizing the autoclave. The product is worked up by first distilling off the unreacted isobutylene. The distillant (residue) is further distilled at atmospheric pressure or in vacuo to obtain as overhead the tertiarybutoxyethanol.

Into a 100 ml. flask fitted with an 18" distillation column were placed 20 grams of stabilized methyl methacrylate, 59 grams of tertiarybutoxyethanol and 0.05 grams of tetraisopropyl titanate catalyst. The mixture was heated at 130–145° C. for about 4 hours during which time 5 grams of methanol was collected overhead. The mixture was then distilled in vacuo to afford unreacted tertiarybutoxyethanol and tertiarybutoxyethyl methacrylate B.P. 42–44° C/0.07–0.008 mm., $n_D^{20}$ 1.4306, $D^{20}/4$ 1.0491.

*Example I.—Bulk polymerization of 2-tertiarybutoxyethyl methacrylate*

2.21 grams of t-butoxyethyl methacrylate were placed in a small polymerization tube. The tube was flushed with nitrogen and 0.02 grams of benzoyl peroxide added to the tube. The tube was again flushed with nitrogen and sealed. The tube was placed in an oven at 70° C. for a period of 24 hours. Polymerization of the monomer took place to give a glassy thermoplastic polymer, which could be molded into sheets or cast into films. Infrared examination of the polymer showed characteristic absorption for the tertiarybutoxy grouping and ester grouping.

*Example II.—Solution polymerization of 2-tertiarybutoxyethyl methacrylate*

Into a 4-necked flask equipped with nitrogen inlet tube, condenser, stirrer and thermometer were placed 18.22 grams of 2-tertiarybutoxyethyl methacrylate, 13 grams of methyl ethyl ketone and 0.09 gram of benzoyl peroxide. The mixture was heated under reflux for a period of three hours, after which time the contents became very viscous, indicating that polymerization of the monomer had taken place. Evaporation of the solvent gave a thermoplastic polymer which was similar to the polymer prepared in bulk.

*Example III.—Formation of poly(2-hydroxyethyl) methacrylate from poly(2-tertiarybutoxyethyl)methacrylate*

To a solution of about 40 ml. of methyl ethyl ketone containing 13 grams of poly(2-tertiarybutoxyethyl)methacrylate, prepared according to Example II, was added 0.2 gram of phosphotungstic acid. The mixture was charged to a four-necked flask containing a heater, stirrer, thermometer and condenser connected to a series of small Dry-Ice traps. The mixture was heated under reflux and isobutylene immediately began to collect in the Dry-Ice trap. After about one hour 4.3 grams of isobutylene was collected and a portion of the polymer precipitated from solution. The solvent was removed from the polymer and the polymer was dried in vacuo. Infrared analysis of the polymer showed no evidence of the tertiarybutoxyethyl group and showed absorption characteristics of hydroxyl group and ester group. The infrared spectrum of this polymer was identical with a polymer prepared by polymerizing 2-hydroxyethyl methacrylate independently.

Similar experiments were conducted in which only a portion of the isobutylene was liberated from poly(2-tertiarybutoxyethyl)methacrylate. This permitted the formation of polymers containing both tertiarybutoxyethyl and hydroxyethyl groupings.

*Example IV.—Emulsion copolymerization of 2-tertiarybutoxyethyl methacrylate with methyl methacrylate*

Many copolymers were prepared from tertiarybutoxyalkyl methacrylates and methyl methacrylate. In a typical experiment 20.0 g. (0.2 mole) of methyl methacrylate and 3.7 grams (0.02 mole) of tertiarybutoxyethyl methacrylate were charged to a flask containing 50 grams of deionized water, 2.4 grams of sodium lauryl sulfate and 0.05 gram of ammonium persulfate. The reaction flask was heated in a water bath and the premixed monomers were added rapidly until about one-half of the monomer charge was added. Nitrogen was bubbled into the reaction flask throughout the reaction period to eliminate oxygen from the mixture. During the initial monomer addition, the temperature rose from 71° C. to 90° C. The remainder of the monomer mixture was then added over a period of about one-half hour. After polymerization was complete the emulsion was treated with saturated aluminum ammonium sulfonate, which caused precipitation of the polymer from the emulsion. The resulting white polymer was washed several times in a Waring Blendor with water and finally dried in vacuo at 70° C. for 12 hours. The dried, white, powdery polymer weighed 23.3 grams.

The tertiarybutoxyethyl groups of the copolymer are readily converted to hydroxyethyl groups by heating the polymer per se, or in solution with phosphotungstic acid, sodium bisulfate, p-toluene sulfonic acids or the like.

*Example V.—Emulsion copolymerization of 1-tertiarybutoxy-2-propyl methacrylate with methyl methacrylate*

1-tertiarybutoxy-2-propyl methacrylate was prepared by placing into a 300 ml. flask fitted with a thermometer, nitrogen inlet tube and distillation head, 33 gms. of methyl methacrylate, 0.3 gm. of dibutyl tin oxide, 0.4 gm. of hydroquinone and 132 gms. of 1-tertiarybutoxy-2-propanol. The latter compound was prepared from the reaction of isobutylene and propylene glycol using a Dowex 50 catalyst. The reactants were heated under a nitrogen atmosphere for about 14 hours at 140–150° C. during which time 12.1 grams of methanol was collected overhead. The cooled reaction mixture was filtered to remove the undissolved catalyst and distilled in vacuo. Distillation gave, initially, some unreacted methyl methacrylate, unreacted 1-t-butoxy-2-propanol and pure 1-t-butoxy-2-propyl methacrylate, B.P. 41° C./0.15 mm., $n_D^{20}$ 1.4275, sp. gr. 20/4 0.9169.

A copolymer was prepared from 20 grams of methyl methacrylate (0.2 mole) and 1-tertiarybutoxy-2-propyl methacrylate using the emulsion technique described in Example IV. The copolymer product weighed 22.6 grams and was shown to contain tertiarybutoxy propyl groups by infrared analysis. The copolymer was useful for preparing laminates, films and coatings, moldings, etc. When the copolymer was heated in the presence of acidic catalysts it was possible to liberate isobutylene from the copolymer, thereby converting the tertiarybutoxypropyl groups into hydroxypropyl groups.

*Example VI.—Emulsion copolymerization of styrene and 1-tertiarybutoxy-2-propyl methacrylate*

The following ingredients were employed for emulsion copolymerization of styrene and 1-tertiarybutoxy-2-propyl methacrylate:

| | Gms. |
|---|---|
| Styrene (redistilled) | 13.3 |
| 1-t-butoxy-2-propyl methacrylate | 5.0 |
| Potassium per sulfate (catalyst) | .05 |
| Sodium hydrogen phosphate (buffer) | .05 |
| Sodium lauryl sulfate (emulsifier) | 1.0 |
| Distilled water | 100 |

The catalyst, emulsifier and buffer were added to a 4-necked reaction flask while purging the flask with nitrogen. The monomers were pre-mixed and added to the stirred flask to effect emulsification of the system. The well-stirred charge was heated, under nitrogen, at 70° C. for 2 hours and at 90° C. for an additional 2 hours. After polymerization was complete, alum was added to precipitate the polymer. The filtered, washed, and dried polymer weighed 18 grams. Infrared analysis showed the presence of t-butoxypropyl groups and styrene groups in the polymer, indicating that copolymerization had taken place.

*Example VII.—Solution copolymerization of styrene and methyl 2-tertiarybutoxylethyl fumarate*

Methyl 2-t-butoxyethyl fumarate is formed by placing into a 2-liter flask fitted with a nitrogen inlet tube, stirrer, condenser and receiver, 493 grams of tertiarybutoxyethanol and 200 grams of dimethyl fumarate. To this mixture is then added 2 grams of tetraisopropyl titanate. The mixture is heated to a temperature of 140–180° C. for several hours, until about 2 moles of methanol is collected as overhead. Distillation of the mixture is then carried out in vacuo and provides pure methyl t-butoxyethyl fumarate, B.P. 96° C./0.08 mm., $n_D{}^{25}$/1.4460.

Into a 100 ml., 4-necked flask equipped with a stirrer, thermometer, condenser, heating bath and nitrogen inlet tube was placed the following:

| | Gms. |
|---|---|
| Styrene (redistilled) | 15 |
| Methyl 2-t-butoxyethyl fumarate | 6.62 |
| Methyl ethyl ketone | 15 |
| Benzoyl peroxide | 0.12 |

The ingredients were heated under reflux, with stirring, for a period of about 16 hours. During this time the solution became very viscous, indicating that polymerization had taken place. The polymer was precipitated from the methyl ethyl ketone solution by the addition of methanol. The precipitated polymer was a white, powdery solid and was dried in vacuo at 60° C. for 8 hours. The dried polymer weighed 16.7 grams. Infrared analysis of the polymer showed the presence of the ester grouping, the t-butoxyethyl grouping and the aromatic nucleus, indicating that copolymerization had taken place. The polymer was molded into plastic sheets in a press at 160° C.

*Example VIII.—Preparation of copolymer of styrene and methyl 2-hydroxyethyl fumarate from copolymer of styrene and methyl 2-t-butoxyethyl fumarate*

Into a 4-necked fitted with a thermometer, nitrogen inlet tube, stirrer, reflux condenser (attached to Dry Ice traps) and heating mantel was placed 5.0 grams of the copolymer of styrene and methyl-2-t-butoxyethyl fumarate as prepared in Example VII. Thirty-six grams of methyl ethyl ketone and .05 gram of phosphotungstic acid were then added to the flask. As soon as the mixture reached the reflux temperature of methyl ethyl ketone, isobutylene commenced to collect in the Dry Ice traps. After a period of about 25 minutes approximately 0.21 gram of isobutylene was collected. The polymer was precipitated from the methyl ehtyl ketone solution with isopentane and dried in vacuo. Four grams of a thermoplastic polymer was obtained. Infrared analysis of the polymer showed the presence of hydroxyl groups, carbonyl groups (ester) and aromatic bands, indicating that conversion of the t-butoxyethyl groups to hydroxyethyl groups had taken place.

*Example IX.—Solution copolymerization of vinylidene chloride with bis (2-tertiarybutoxyethyl)maleate*

Into a 2-liter, 4-necked flask equipped with a stirrer, thermometer, Dean Stark trap and condenser was placed 1 mole of maleic anhydride (98.06 grams) and 2.2 moles of 2-tertiarybutoxyethanol, together with 500 ml. of toluene. The mixture was heated under reflux for several days and the water of reaction removed continuously during the course of the reaction. After the theoretical amount of water was formed, the solvent was removed and the bis(2-tertiarybutoxyethyl) maleate was purified by distillation under reduced pressure, and showed a boiling point of 156° C. at 0.3 mm., $n_D{}^{20}$ 1.4490, $D_4{}^{20}$ 1.0237.

Into a 100 ml. flask fitted with heater, stirrer, thermometer and condenser was placed 20 grams of vinylidene chloride and 12.8 grams of bis(2-tertiarybutoxyethyl) maleate. To this mixture was then added 22 grams of methyl ethyl ketone and 0.16 gram of benzoyl peroxide. The mixture was heated under reflux for 6 hours under a nitrogen atmosphere with continuous stirring. After cooling the reaction mixture to room temperature it was poured into methanol, which caused immediate precipitation of polymer. The polymer was filtered and dried in vacuo. The dried polymer weighed 13.7 grams and was a white thermoplastic solid which formed hard films and sheets. Infrared analysis of the polymer showed the presence of the carbonyl ester function, the C–Cl grouping and t-butoxy groupings, indicating the copolymerization had taken place. Rapid liberation of isobutylene occurred when the polymer was heated in the presence of sodium bisulfate in solution or in bulk, which resulted in the conversion of the t-butoxyethyl groups of the polymer to hydroxyethyl groups.

*Example X.—Solution copolymerization of styrene with 2-tertiarybutoxyethyl crotonate*

In a 1-liter flask fitted with a stirrer, condenser, receiver, thermometer and heating mantel were placed 150 grams of methyl crotonate and 466 grams of tertiarybutoxyethanol. To this mixture was then added 0.5 gram of dibutyl tin oxide ester interchange catalyst. The mixture was heated to 110° C. whereupon methanol commenced to distill from the reaction mixture. After slightly more than one mole of methanol was collected the mixture was cooled and distilled in vacuo. A mixture of the cis and trans t-butoxyethyl crotonate esters was obtained B.P. 65–76° C./1.25 mm., a center cut from the distillation was analyzed: calcd. C, 64.89%, H, 9.74%; found C, 64.66%, H, 9.79%. $n_D{}^{25}$ 1.4355.

Forty grams of styrene, 14.3 grams of 2-tertiarybutoxyethyl crotonate, 0.27 gram of benzoyl peroxide and 36 grams of methyl ethyl ketone were charged to the resin flask and polymerized as described in the preceding example. After precipitation in methanol, followed by washing and drying, 31.5 grams of dried thermoplastic white polymer was obtained, which showed the presence of carbonyl groups, tertiarytutoxy groups and aromatic groups by infrared analysis.

A small amount of the polymer was heated in methyl ethyl ketone solution under reflux in the presence of phosphotungstic acid, which caused liberation of isobutylene and the formation of hydroxyethyl end groups in the copolymer.

*Example XI.—Bulk copolymerization of bis (2-t-butoxyethyl) maleate with styrene*

Into a 15 ml. polymerization tube was placed 2.6 grams of bis(2-t-butoxyethyl) maleate (see Example IX) and 1.0 gram of redistilled styrene. The tube was flushed with nitrogen for several minutes to remove any dissolved oxygen. Benzoyl peroxide (0.007 gram) was then added to the tube and the tube was sealed. The tube was heated at 70° C. for 24 hours, after which time a very viscous polymer was obtained. The polymer was dissolved in petroleum ether and methanol was added to the petroleum ether solution. Immediate precipitation of a solid polymeric material occurred. Infrared examination of the polymer showed characteristic absorption for the ester grouping, the tertiary butoxy grouping and aromatic grouping, indicating that copolymerization had occurred. By varying the ratio of styrene to bis(2-t-butoxyethyl) maleate varieties of polymer differing in solubility characteristics and softening points were produced. These polymers were useful as coatings and laminating resins. Prolonged heating of the polymers caused cross-linking to occur as evidenced by their insolubility in organic solvents after heating.

*Example XII.—Bulk copolymerization of bis (2-t-butoxyethyl) itaconate with styrene*

Into a 100 ml. flask equipped with a nitrogen inlet tube, thermometer, receiver, and condenser was placed 22 grams of dimethyl itaconate and 49.3 grams of tertiarybutoxyethanol. To this mixture was then added 0.1 gram of tetraisopropyl titanate catalyst. The mixture was heated at 140–155° C. for about 7 hours in a nitrogen atmosphere, after which time about 9 grams of methanol was distilled overhead. After removing the unreacted t-butoxyethanol by distillation, further distillation gave bis(2-tertiarybutoxyethyl) itaconate B.P. 130° C. at 0.1 mm., $n_D^{20}$ 1.4468, $D^{20}/4$ 1.0149.

Four grams of bis(2-tertiarybutoxyethyl) itaconate and 1.2 grams of redistilled styrene were placed in a 15 ml. polymerization tube together with 0.1 gram of benzoyl peroxide. The tube was sealed after purging with nitrogen and heated at 70° C. for 43 hours. A hard glassy polymeric material was formed, which was reprecipitated by dissolving in petroleum ether, followed by the addition of methanol. The polymer formed flexible films and coatings.

Copolymers of styrene and bis(2-t-butoxyethyl) itaconate of varying compositions were prepared by changing the ratio of monomers. These polymers ranged from low melting to high melting solids and were soluble in most hydrocarbon solvents.

*Example XIII.—Copolymerization of vinyl acetate and bis(2-t-butoxyethyl)maleate*

Eight grams of vinyl acetate, 2.0 grams of bis(2-t-butoxyl) maleate (see Example IX) and 0.05 gram of benzoyl peroxide were placed in a 15 ml. polymerization tube which was purged with nitrogen prior to sealing. The tube was heated at 70° C. for 24 hours. A hard glassy polymer formed which was reprecipitated from benzene by the addition of methanol. Infrared analysis confirmed the presence of the ester group and t-butoxyethyl group indicating that copolymerization had taken place. The copolymer formed flexible sheets when molded and could also be cast into hard flexible films from solution. The copolymer showed more flexibility than a homopolymer of vinyl acetate prepared in a similar fashion.

*Example XIV.—Emulsion polymerization of vinyl chloride with bis(2-tertiarybutoxyethyl)itaconate*

Into a 300-ml. stirred autoclave were placed 100 grams of water, 1.0 gram of sodium lauryl sulfate, 0.75 gm. of ammonium persulfate, 0.30 gm. of sodium bisulfite and 1.6 gm. of bis(2-t-butoxyethyl) itaconate. (See Example XII.) The autoclave was sealed and flushed with nitrogen thoroughly to eliminate oxygen from the mixture. Vinyl chloride (32 gm.) was then charged to the autoclave, which was stirred and heated at 70° C. for 4 hours. The autoclave was cooled and the emulsion treated with sodium chloride solution which caused precipitation of polymer. The polymer was washed thoroughly with water in a Waring Blendor and dried in vacuo. The dried polymer weighed 22 grams. Infrared analysis showed the presence of the C–Cl grouping and tertiarybutoxyethyl groupings in the polymer, indicating that copolymerization took place. Tough, fairly flexible films of the copolymer were cast from tetrahydrofuran solution. The copolymer was made into a plastisol with dioctyl phthalate and when heated formed a tough, flexible, plasticized polymer. Numerous other copolymers of vinyl chloride and bis(2-t-butoxyethyl) itaconate were prepared in which the ratio of itaconate ester to vinyl chloride was increased so that the final copolymer contained up to 20 mole percent bis(2-t-butoxyethyl) itaconate. The copolymers containing the higher amounts of itaconate ester formed more flexible films and plasticized polymers. These copolymers could also be heated in solution or in bulk, with an acidic catalyst, to convert the tertiarybutoxyethyl groupings to hydroxyethyl groupings.

*Example XV.—Emulsion polymerization of vinyl chloride with bis(2-tertiarybutoxyethyl)maleate*

Using the above emulsion technique, the following recipe was employed for copolymerizing vinyl chloride with bis(2-tertiarybutoxyethyl)maleate:

| | Grams |
|---|---|
| Water | 100 |
| Sodium lauryl sulfate | 2 |
| Ammonium persulfate | 0.75 |
| Sodium bisulfite (meta) | 0.3 |
| Vinyl chloride | 15.5 |
| Bis(2-t-butoxyethyl)maleate | 3.3 |

The reaction was carried out for four hours at 70° C. to give 12.5 grams of copolymer. In another experiment 16 grams of vinyl chloride and 0.80 gram of maleate ester were polymerized. Infrared analysis of these polymers showed that both the C–Cl grouping and tertiarybutoxyethyl grouping were present, indicating that copolymerization had taken place. These polymers were purified by dissolving in tetrahydrofuran and reprecipitating with methanol. Films of the polymers were cast from tetrahydrofuran solution and were found to be tough, flexible and transparent. Plastisols of good quality could also be prepared by mixing the polymers with dioctylphthalate. These plastisols formed transparent sheets when calendered.

*Example XVI.—Emulsion polymerization of vinyl chloride with bis(2-tertiarybutoxyethyl)fumarate*

Into a 100 ml. flask equipped with a nitrogen inlet tube, thermometer, condenser, and receiver is placed 15 grams of dimethyl fumarate and 36.7 grams of 2-tertiarybutoxyethanol. To this mixture is added 0.1 gram of tetraisopropyl titanate and the mixture is heated for about 13 hours from 135 to 180° C. while continuously bubbling nitrogen through the mixture. After about 6 grams of methanol is collected the mixture is distilled to remove the excess tertiarybutoxyethanol. Further distillation gives bis(2-tertiarybutoxyethyl)fumarate, B.P. 132° C. at 0.1 mm., which solidifies to a crystalline solid, M.P. 35–36°.

Vinyl chloride copolymers containing varying amounts of bis(2-tertiarybutoxyethyl)fumarate were prepared using the previously described emulsion technique for copolymerizing the bis(2-tertiarybutoxyethyl)itaconate and maleate with vinyl chloride. In a typical experiment, the following ingredients were polymerized in the 300 ml. autoclave for about 4 hours at 160° F.:

| | Grams |
|---|---|
| Water | 100 |
| Sodium lauryl sulfate | 5.0 |
| Ammonium persulfate | 0.75 |
| Sodium bisulfite (meta) | 0.30 |
| Vinyl chloride | 15 |
| Bis(2-t-butoxyethyl)fumarate | 3.0 |

The polymer was washed and dried in the usual fashion and weighed 11 grams. Infrared analysis of the polymer showed the presence of the C–Cl grouping, ester grouping and t-butoxyethyl grouping, indicating that copolymerization had taken place.

*Example XVII.—Emulsion polymerization of butadiene with bis(2-tertiarybutoxyethyl)maleate*

A rubber-like copolymer of butadiene and bis(2-tertiarybutoxyethyl)maleate was prepared using the following reactants and emulsion system:

| | Grams |
|---|---|
| Butadiene | 36 |
| Sodium stearate | 5 |
| Distilled water | 180 |
| Potassium persulfate | 0.3 |
| Dodecyl mercaptan | 0.5 |
| Bis(2-tertiarybutoxyethyl)maleate | 5 |

All the ingredients, except the butadiene, were charged to the autoclave, which was deoxygenated with nitrogen prior to sealing. Butadiene was then charged to the autoclave and the mixture heated for 20 hours with rapid stirring. After cooling, the emulsion was removed from the autoclave and treated with saturated ammonium aluminum sulfate, which caused precipitation of the polymer. The polymer was washed in ethanol containing phenyl beta naphthylamine and dried in vacuo. The dried polymer weighed 37.5 grams and was a rubber-like, crumbly, material.

*Example XVIII.—Emulsion copolymerization of 3,3-dimethyl-1-butene with bis(2-tertiarybutoxyethyl)fumarate*

Into a 300 ml. stirred autoclave were charged 180 ml. distilled water, 5 grams of sodium stearate, 1.0 gms. of potassium persulfate and 3.0 grams of bis(2-t-butoxyethyl) fumarate. The autoclave was sealed and purged with nitrogen. Ten grams of 3,3-dimethyl-1-butene was then introduced into the autoclave from a pressure vessel and the autoclave heated, with stirring, for a period of about 40 hours at 175–180° F. After cooling, the emulsion was removed from the autoclave and treated with alum, which caused precipitation of solid polymer. The solid polymer was dried on a Buchner funnel and heated in methanol. A portion of the polymer (1.6 grams) was found to be methanol insoluble and the remaining polymer (5 gms.) was soluble in methanol. The soluble portion was isolated from the methanol solution by adding water which caused immediate precipitation of solid polymer.

*Example XIX.—Bulk copolymerization of bis(2-tertiarybutoxyethyl) itaconate and acrylonitrile*

Into a 15 ml. polymerization tube were placed 3.3 grams of bis(2-t-butoxyethyl) itaconate and 0.53 grams of acrylonitrile. The tube was deoxygenated with nitrogen and 0.008 gram of benzoyl peroxide catalyst added. The tube was then sealed and heated at 70–80° C. for several days. A very viscous liquid polymer was obtained, which was dissolved in petroleum ether and precipitated from solution to give a low melting solid polymer. Infrared analysis of the polymer showed the presence of nitrile groups and tertiary butoxyethyl groups, indicating that copolymerization had taken place.

*Examples XX to XXV.—Preparation of tertiarybutoxyethyl-containing polymers by gamma radiation from a cobalt 60 source*

In order to demonstrate that irradiation initiation can be employed for preparing copolymers containing the tertiarybuoxyethyl groups, many experiments were carried out in which homopolymers and copolymers were prepared.

The experiments were carried out by placing the monomer or monomers into a 15-ml. polymerization tube. The tube was then cooled in liquid nitrogen and degassed in vacuo by successively freezing and thawing the contents of the tube until no further gas evolution occurred. The tube was then sealed in vacuo and irradiated with a cobalt 60 source, at the dose rate indicated. The results of these experiments are tabulated below:

GAMMA RAY POLYMERIZATION OF TERTIARYALKOXYALKYL MONOMERS

| Run | Identity of Monomer | Dose Rate | Results of Irradiation |
|---|---|---|---|
| XX | 2.0 gm. Bis[(2-t-butoxyethyl) Fumarate] | $4.2 \times 10^6$ roentgens per hour for 21 hours. | Solid thermoplastic polymer produced. |
| XXI | 2.31 gm. [2-t-butoxyethyl Crotonate] | do | Liquid polymer produced. |
| XXII | 2.41 gm. [bis(2-t-butoxyethyl) Itaconate] | do | Solid thermoplastic polymer produced. |
| XXIII | 3.44 gm. Styrene and 1.25 gm. [Bis(2-t-butoxyethyl) Fumarate]. | $22.2 \times 10^6$ roentgens per hour for 111 hours. | White, opaque, solid thermoplastic polymer produced. |
| XXIV | 4.39 gm. Styrene and 1.83 gm. [Bis(2-t-butoxyethyl) Itaconate]. | do | Clear, solid thermoplastic polymer produced. |
| XXV | 3.28 gm. Styrene and 1.78 gm. [Bis(2-t-butoxyethyl) Crotonate]. | do | Do. |

It is claimed:

1. A method for preparing an addition polymer containing about 1 to 100% of a hydroxyalkyl ester of an olefinically unsaturated carboxylic acid which comprises subjecting a polymer having an average molecular weight of at least about 500 formed by polymerization at the double bond of a monomer containing about 1 to 100% of a tertiary-alkoxyalkyl ester of an olefinically unsaturated carboxylic acid in which the acid group is of 3 to 43 carbon atoms and in which the tertiaryalkoxyalkyl has the formula $-(R_1O)_x-R_2$, where $R_1$ is a divalent aliphatic hydrocarbon radical of 2 to 12 carbon atoms, $R_2$ is a monovalent tertiary aliphatic hydrocarbon radical of 4 to 10 carbon atoms, and x is a number from 1 to 25, the essential balance of the polymer being a copolymerizable olefinic compound of 2 to 12 carbon atoms, to a temperature of about 50 to 200° C. in the presence of an acid catalyst and releasing tertiary olefin from said polymer.

2. The method of claim 1 in which $R_1$ is of 2 to 8 carbon atoms, $R_2$ is of 4 to 7 carbon atoms and x is 1 to 5.

3. The method of claim 1 wherein said polymer has an average molecular weight of about 500 to 2 million.

4. The method of claim 1 in which $-(R_1O)_x-R_2$ is 2-tertiarybutoxyethyl.

5. The method of claim 4 in which the acid is maleic acid.

6. The method of claim 4 in which the acid it itaconic acid.

7. The method of claim 4 in which the acid is fumaric acid.

8. The method of claim 1 wherein said polymer contains about 25 to 75% of said tertiary-alkoxyalkyl ester and about 25 to 75% of said copolymerizable olefinic compound.

9. The polymer of claim 8 wherein said copolymerizable hydrocarbon is one of the group consisting of methyl methacrylate, styrene, vinylidene chloride, vinyl chloride, vinyl acetate, butadiene, 3,3-dimethyl-1-butene and acrylonitrile.

10. The copolymer of claim 9 wherein said acid is one of the group consisting of maleic acid, itaconic acid and fumaric acid.

11. The copolymer of claim 10 wherein $-(R_1O)_x-R_2$ is 2-tertiarybutoxyethyl.

12. The copolymer of claim 11 wherein the ester has two $-(R_1O)_x-R_2$ groups.

13. A method for preparing an addition polymer containing about 25 to 100% of a hydroxyalkyl ester of an olefinically unsaturated dicarboxylic acid which comprises subjecting a polymer having an average molecular weight of about 500 to 2 million formed by polymerization at the double bond of a monomer containing about 25 to 100% of a tertiaryalkoxyalkyl ester of an olefinically unsaturated dicarboxylic acid in which the acid group is of 3 to 12 carbon atoms and in which ester the tertiary-alkoxyalkyl has the formula $-(R_1O)_x-R_2$, where $R_1$ is a divalent aliphatic hydrocarbon radical of 2 to 12 carbon atoms, $R_2$ is a monovalent tertiary aliphatic hydrocarbon radical of 4 to 10 carbon atoms, and x is a number from 1 to 5, and up to about 75% of a copolymerizable olefinic compound of 2 to 12 carbon atoms, to a temperature of about 50 to 200° C. in the presence of an acid catalyst and releasing tertiary olefin from said polymer.

14. The method of claim 13 wherein the ester is a diester having two $-(R_1O)_x-R_2$ groups.

References Cited by the Examiner

UNITED STATES PATENTS

| 1,706,639 | 3/1929 | VanSchaack et al. | 260—475 |
| 2,458,888 | 1/1949 | Rehberg et al. | 260—89.5 |
| 2,876,211 | 3/1959 | Cupery | 260—73 |
| 3,132,120 | 5/1964 | Graham et al. | 260—86.1 |

OTHER REFERENCES

Noller: Chemistry of Organic Chemistry, published by W. B. Saunders Company, (1951) pages 169–170.

JOSEPH L. SCHOFER, *Primary Examiner.*

LEON J. BERCOVITZ, H. WONG, *Assistant Examiners.*